July 3, 1951  R. L. TEMPLIN  2,559,523
EXTRUSION DIE AND METHOD
Filed April 11, 1946

INVENTOR
RICHARD L. TEMPLIN
BY
Robert T. Teeter
ATTORNEY

Patented July 3, 1951

2,559,523

UNITED STATES PATENT OFFICE 2,559,523

EXTRUSION DIE AND METHOD

Richard L. Templin, New Kensington, Pa., assignor to Aluminum Company of America, Pittsburgh, Pa., a corporation of Pennsylvania Application April 11, 1946, Serial No. 661,437

5 Claims. (Cl. 207—10)

This invention relates to improvements in extrusion die structures and extrusion practices to be employed therewith. It is particularly concerned with die structures and methods for the extrusion of light metals and the like, such as aluminum and magnesium and alloys thereof.

The invention has reference to the shape and length of the metal passage or orifice through the extrusion die, and contemplates the adoption of such practices as will permit extrusion speeds far in excess of those previously capable of being used to produce satisfactory extruded shapes.

Heretofore the extrusion art, particularly the art of extruding light metals and the like, has been predicated upon the apparent necessity of using extrusion dies having metal passages or orifices composed of elements all parallel to each other and thus parallel to the direction of extrusion defined thereby. Any of the prior patents hereinafter referred to will illustrate the existence of this prevailing practice, especially as adopted in large hydraulic press equipment. Also, the art has recognized that speeds of extrusion were limited with prevailing die designs.

The prior U. S. patent to Updegraff, No. 2,047,237, discloses a representative example of prior die structures used for the extrusion of solid shapes from ingots or billets. It will be noted that the die shown in this patent has a flat front face with the die bearing composed of parallel elements forming a shearing edge with the front face of the die. Likewise the art relating to the production of hollow extruded shapes has employed similar dies, as disclosed in U. S. patent to Benz, No. 1,841,396. Also in that field of the extrusion art employing so-called "porthole" dies for the production of hollow shapes, parallel element bearings forming shearing edges with flat front die faces are common, as will be noticed in U. S. patent to Underhill, No. 2,135,194.

While it is not customary to do so in the extrusion of light metals and their alloys, it has heretofore been proposed that the front face of the extrusion die be modified so that a wide-angled cone surface is provided for directing the metal flow to the metal passage in the die. Also it has been proposed that a relatively wide flaring opening be employed to lead the metal into the extrusion passage in prior dies. These proposals are at an opposite extreme from the practice normally employed prior to this invention.

Between the aforementioned two extremes of the prior art a critical and novel modification of the actual metal forming passage, orifice, or bearing in an extrusion die has been discovered. That modification consists in forming at least part of the metal passage or orifice, beginning at the front face of the die, of bearing elements which are choked in the direction of extrusion at an angle or angles between about 1 and about 6°. It will be seen in the following discussion that such a die structure positively departs from the usual structures of the prior art and in no way approaches the wide openings proposed in some of the prior patents or literature.

The new die modification is directed toward elimination of surface checking on an extrusion as by supporting the outer fibers of the extrusion being formed and thus preventing the development of high tensile stresses otherwise present therein when the metal is extruded through a parallel die bearing. By this practice higher extrusion speeds may be employed without objectionable surface checking. This invention has for an object, therefore, the modification of extrusion die structures and practices to permit extrusion at speeds greatly in excess of those possible by the employment of prior structures and practices. Another object is the employment of die structures and practices that will minimize or eliminate surface checking on the extrusion being formed, particularly at high extrusion speeds. Further objects are the production of commercially satisfactory extruded shapes at more economical speeds, and the production of shapes of better quality regardless of speed. Other objects and advantages of this invention will appear in the following more detailed discussion.

Figure 1:
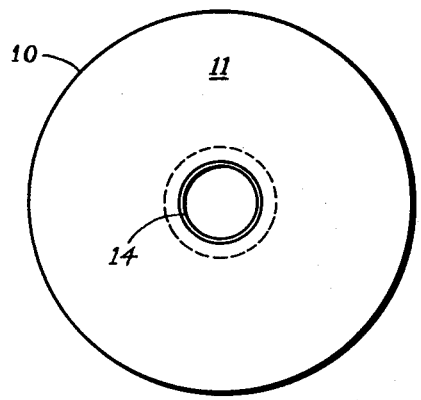
Fig. 1 is a front view of one form of improved die (for a round shape) having a choked element bearing.

All of the figures of the drawing illustrate dies for the production of extruded shapes having regular cross sections, and show choked bearings in which the angle of choke is uniform and constant. It is to be understood that the invention as described hereinafter is equally applicable to complex and irregular shapes and to hollow shapes, whether regular or irregular. Such limitations as are essential regarding the angle and length of the bearings will be made clear in the following detailed discussion, it being understood that the figures of the drawing are merely representative or exemplary of the invention.

In order to make the die structures of the invention more readily understandable, it may be noted that the conventional parallel element die usually has a flat front face against which the ingot or billet is pressed to effect the extrusion of a shape by the flow of metal through the die orifice. A parallel element bearing is one in which the elements are all parallel to the direction of extrusion and form a short right cylinder, or the like, defining the contour of the shape to be produced. The bearing elements begin at the front face and form therewith a right angled shearing edge. Beyond the parallel element bearing, the die is usually provided with a relieved portion so that the metal being extruded has contact with the die only within the parallel element bearing. Such a conventional die is disclosed in prior Patent No. 2,047,237, mentioned above.

Figure 2:
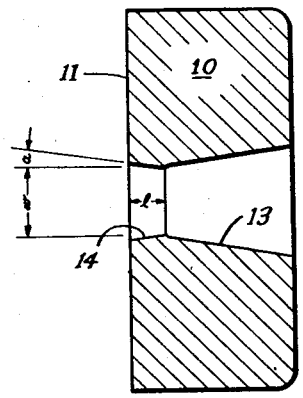
Fig. 2 is a vertical cross section through the center of the die shown in Fig. 1.

Referring now to Figs. 1 and 2, one form of die structure found to be an improvement over prior dies is illustrated. In these figures there is shown a die 10 having the conventional flat front face 11 and the relieved portion 13. The metal passage or orifice of the die, however, is not a parallel element bearing but rather is a choked element bearing 14. The elements of the bearing 14 begin at the front face 11 and form therewith a shearing edge slightly departing from a right-angled shearing edge. More exactly, the elements of the bearing 14 are disposed at an angle, indicated by the letter $a$, to the direction of extrusion, and in converging relationship thereto. The axial length of the bearing 14 is indicated by the letter $l$, and the section dimension, in this case the diameter of the round extrusion being produced, is indicated by the letter $w$. It has been found that a die such as is shown in Figs. 1 and 2 is most successful when the length $l$ of the choked element bearing 14 is substantial, but not appreciably greater than the section dimension $w$. A typical relationship between $l$ and $w$ is shown in Figs. 1 and 2, but this relationship will be discussed more fully hereinafter. It has also been found that the choke angle $a$ should be at least about 1° and not greater than about 6°. The angle of choke $a$ is exaggerated in Figs. 1 and 2 for purposes of illustration, and also will be discussed more fully hereinafter.

Figure 3:
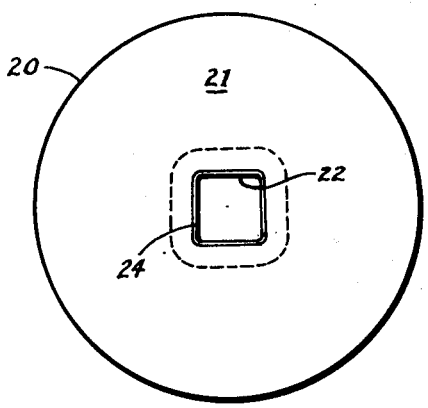
Fig. 3 is a front view of another form of improved die (for a rounded rectangular shape) having a combination of choked and parallel element bearings.
Figure 4:
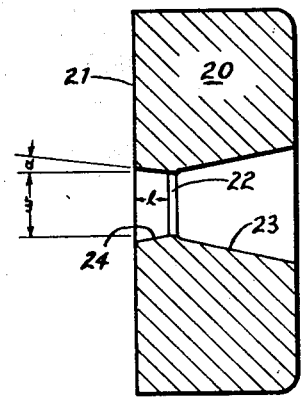
Fig. 4 is a vertical cross section through the center of the die shown in Fig. 3.

Referring now to Figs. 3 and 4, a preferred form of die structure is illustrated. In these figures the die 20 also has the conventional flat front face 21. Within the die 20 there is provided a short parallel element bearing 22 followed by the conventional relieved portion 23. Between the front face 21 and the parallel element bearing 22 there is a choked element bearing 24 leading thereto, similar to that shown in Figs. 1 and 2. The elements of the choked bearing 24 begin at the front face 21 and form therewith a shearing edge slightly departing from a right-angled shearing edge. More exactly, the elements of the bearing 24 are disposed at an angle, indicated by the letter $a$, to the direction of extrusion, and converge in that direction to meet the elements of the parallel element bearing 22. The axial length of the choked element bearing 24 is indicated by the letter $l$, and the section dimension, in this case the distance between the sides of the rounded rectangular extrusion being produced, is indicated by the letter $w$. As in the case of the die structure shown in Figs. 1 and 2, it is preferred that the length $l$ be substantial, but not appreciably greater than the dimension $w$. It is also preferred that the angle $a$ be between 1 and 6°. The length of the parallel element bearing 22 is not critical but should be short, as in conventional practice. It is preferred that dies of the invention have a parallel element bearing in order that the cross sectional dimensions of the extruded shape may be accurately maintained throughout a longer useful period between die repairs than would be possible with simple choked bearing dies, but the invention is not necessarily limited to such dies.

In conventional extrusion dies, high tensile stresses are created in the outer fibers of the shape being extruded, probably by drag or friction forces created by the movement of metal through the die. These tensile stresses are complementary to the high compressive stresses produced on the section of the shape, especially the center thereof, in order to effect extrusion thereof. When attempts are made to extrude metal at high speeds, unsatisfactory surfaces are produced on the extruded shape, characterized by what is commonly called "surface checking," and believed to result from the above-mentioned high tensile stresses in the outer fibers of the metal. Die structures such as are represented in the drawing tend, through their choked bearings, to support the metal flowing into the extruded shape, particularly the outer fibers thereof, and thus prevent the building up of high tensile stresses usually present in this region when the shape is being produced.

The advantages of the die structures of this invention may readily be recognized by considering the following comparisons. With conventional parallel element dies, the maximum permissible speeds of extrusion (speeds of egress from the die) for various representative strong aluminum alloys, such as 14S, 17S, 24S, and 75S have been between about 20 and about 50 feet per minute. Standard practices for the extrusion of such strong aluminum alloys have often been considerably lower than the speeds given above and have ranged as low as about 12 to about 20 feet per minute. When attempts are made to extrude strong aluminum alloys at appreciably higher speeds through conventional parallel element bearings, excessive surface checking develops and the shapes are commercially unsatisfactory. With dies such as are shown in the drawing various strong aluminum alloys have been extruded at speeds as high as 200 to 350 feet per minute, and the surface checking has been largely, if not entirely, eliminated. Some strong aluminum alloys have been extruded with dies of the invention at 400 feet per minute.

Tests have been made on the extrusion of strong aluminum alloys with conventional parallel element dies and with dies having choke angles from 0° 30′ to 8°. It was found that the above-mentioned high extrusion speeds were possible with the latter type of dies having choke angles as small as 1°. Choke angles of 2, 3 and 4° were very satisfactory, and a choke angle of about 3° is preferred. When a choke angle of 8° was tried, the shapes produced were definitely inferior from the standpoint of surface checking and general quality, again imposing extrusion speed limitations such as exist with conventional parallel element dies.

It was further found that surface checking tended to increase with decrease in the length of choked bearing below about one-third of the section dimension, especially in the case of small shapes. Choked bearings appreciably longer than the section dimension especially in the case of large shapes, were found to be objectionable in that they increased the tendency of the die bearing to produce surface scoring on the extruded shape.

The words "section dimension" have been used in the above description to describe the diameter of the round die opening or shape shown in Figs. 1 and 2, or to describe the distance between sides of the rounded rectangular die opening or shape shown in Figs. 3 and 4. Irregular or complex extrusions and their corresponding dies will have several section defining dimensions of width and length. For example, angles and T's may have equal or unequal legs, leg thicknesses, flanges, and flange thicknesses. More complicated shapes may have a number of section defining dimensions. As used herein "section dimension" means direct distance across a die opening defining a thickness of an extrusion or part thereof, as contrasted to the distance along a die opening defining a width of an extrusion or part thereof.

For example, the leg thickness of an angle or the flange or leg thickness of a T would correspond to a section dimension. When there are two or more section dimensions, the smallest such dimension may be called the "minor section dimension," and the largest such dimension may be called the "major section dimension." Thus it is not intended that the length of a leg of an angle, or a diagonal distance across corners of a rectangular section such as is shown in Figs. 3 and 4, be considered a section dimension nor, a major section dimension.

While it has been pointed out that the figures in the drawing show shearing edges between the choked bearing elements and the front face of the die, it is to be understood that a slight rounding or radiusing at this edge is permissible, and that the shape of the front face of the die outside this edge is immaterial to this invention. Tests have indicated that such rounding of the shearing edge may be desirable with certain shapes and alloys when using die structure of the invention. Furthermore, for extrusions of irregular shape, it has been found that some variations in the amount of choke around various peripheral portions of the die are advantageous.

Another peculiarity that has been noted in connection with the use of dies constructed according to the invention is that some surface checking is sometimes encountered at extrusion speeds slightly above those normally employed with parallel element dies, but that the severity of this surface checking decreases as the speed is further increased. At speeds of extrusion above about 150 feet per minute the surface checking is light, if at all apparent, and is in any case principally confined to the front portion of the extrusion.

The die structures of the invention as described above, along with the certain practices adopted therewith as specified below, lend themselves to the performance of new methods of extrusion. One method is practiced by heating a billet or ingot to 600 to 750° F., placing it in the billet container of an extrusion press, and pressing it between the ram and the extrusion die to produce an extruded shape by rapid flow of the metal therethrough. The metal is supported and guided by a choked die bearing so as to flow first at an angle (as defined hereinabove) to the general direction of extrusion, and then parallel to the general direction of extrusion, with or without support and guidance from a parallel die bearing. The method has additional novel aspects in that a commercially satisfactory surface can be obtained with extrusion speeds as high as 150 to 400 feet per minute in contrast to prior speeds mentioned herein.

While specific embodiments and practices of the invention have been illustrated and described, it is to be understood that numerous modifications may be made therein within the scope of the appended claims. It is readily understandable that the invention can be applied to production of hollow shapes by modifying die structures such as are shown in Patents Nos. 1,841,596 or 2,135,194 above-mentioned, in accordance with the above teachings.

What is claimed is:

1. An extrusion die having a bearing substantially uniformly choked at an angle between about 1 and about 6°, said bearing having an axial length between about one-third of the minor section dimension and about the major section dimension of die opening at said bearing.

2. An extrusion die having a bearing with the majority of its elements at a choke angle between 2 and 4°, said bearing having an axial length between about one-third of the minor section dimension and about the major section dimension of die opening at said bearing.

3. An extrusion die having a parallel element bearing and a bearing leading thereto substantially uniformly choked at an angle between about 1 and about 6°, said choked bearing having an axial length between about one-third of the minor section dimension and about the major section dimension of die opening at said parallel bearing.

4. An extrusion die having a parallel element bearing and a bearing with the majority of its elements leading thereto at a choke angle between 2 and 4°, said choked bearing having an axial length between one-third of the minor section dimension and the major section dimension of die opening at said parallel bearing.

5. That improved method for the hot extrusion of aluminum base alloys and the like from ingots or billets thereof, as is done in large hydraulic presses, wherein the speed of extrusion is greatly increased from prior speeds of between about 12 and about 50 feet per minute to speeds previously unattainable, comprising die expressing the metal at temperatures between about 600 and 750° F. and at speeds between about 200 and 400 feet per minute by extruding the same through a metal passage which is choked at an angle between 1 and 6°, the metal being choked over a length between about one-third the minor section dimension and about the major section dimension of the extrusion being produced, whereby an extrusion is produced which is substantially free of surface checking.

RICHARD L. TEMPLIN.

REFERENCES CITED

The following references are of record in the file of this patent:

UNITED STATES PATENTS

| Number | Name | Date |
|---|---|---|
| 2,341,749 | Webb | Feb. 15, 1944 |

FOREIGN PATENTS

| Number | Country | Date |
|---|---|---|
| 216,468 | Switzerland | Dec. 1, 1941 |